United States Patent
Mihelich et al.

(10) Patent No.: US 10,038,671 B2
(45) Date of Patent: Jul. 31, 2018

(54) FACILITATING ENFORCEMENT OF SECURITY POLICIES BY AND ON BEHALF OF A PERIMETER NETWORK SECURITY DEVICE BY PROVIDING ENHANCED VISIBILITY INTO INTERIOR TRAFFIC FLOWS

(71) Applicant: Fortinet, Inc., Sunnyvale, CA (US)

(72) Inventors: Joseph R. Mihelich, Folsom, CA (US); Amit Srivastav, Dublin, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/396,500

(22) Filed: Dec. 31, 2016

(65) Prior Publication Data
US 2018/0191681 A1    Jul. 5, 2018

(51) Int. Cl.
*H04L 29/06*    (2006.01)
(52) U.S. Cl.
CPC ........ *H04L 63/0263* (2013.01); *H04L 63/162* (2013.01); *H04L 63/164* (2013.01); *H04L 63/20* (2013.01); *H04L 63/0272* (2013.01)
(58) Field of Classification Search
CPC ... H04L 63/0263; H04L 63/20; H04L 63/164; H04L 63/0272
See application file for complete search history.

(56) References Cited

U.S. PATENT DOCUMENTS

| | | | | |
|---|---|---|---|---|
| 5,968,176 | A * | 10/1999 | Nessett | H04L 63/02 726/11 |
| 9,258,277 | B1 * | 2/2016 | Zhuang | H04L 63/0236 |
| 2005/0240990 | A1 * | 10/2005 | Trutner | H04L 63/0227 726/11 |
| 2006/0041937 | A1 * | 2/2006 | Chandley | H04L 63/0218 726/12 |
| 2008/0235755 | A1 * | 9/2008 | Blaisdell | H04L 63/102 726/1 |
| 2010/0226379 | A1 * | 9/2010 | Sun | H04L 41/0893 370/400 |
| 2011/0277034 | A1 * | 11/2011 | Hanson | H04L 63/1433 726/25 |

(Continued)

*Primary Examiner* — Michael Pyzocha
(74) *Attorney, Agent, or Firm* — Hamilton, DeSanctis & Cha LLP

(57) ABSTRACT

Systems and methods for managing network traffic by a perimeter network security device based on internal network traffic or configuration information are provided. According to one embodiment, a network security appliance of a private network receives internal network information collected by multiple Layer 2/3 network devices of the private network. The Layer 2/3 network devices switch/route internal network traffic among multiple internal host devices without the network traffic passing through the network security device and switch/route external network traffic between the network security appliance and the internal host devices. A topology of the private network is derived based on the internal network information. Existence of potential malicious activity involving an internal host device is identified by evaluating the internal network information. Responsive thereto (i) a traffic policy is created to control transmission of network traffic associated with the internal host device; and (ii) the traffic policy is enforced.

19 Claims, 7 Drawing Sheets

(56) References Cited

U.S. PATENT DOCUMENTS

| | | | |
|---|---|---|---|
| 2013/0031621 A1* | 1/2013 | Jenne | H04L 63/02 726/13 |
| 2013/0042317 A1* | 2/2013 | Nakashima | H04L 49/355 726/13 |
| 2013/0117847 A1* | 5/2013 | Friedman | H04L 63/102 726/22 |
| 2013/0152187 A1* | 6/2013 | Strebe | H04L 63/101 726/11 |
| 2014/0157415 A1* | 6/2014 | Abercrombie | G06F 21/554 726/23 |
| 2014/0164595 A1* | 6/2014 | Bray | H04L 63/02 709/224 |
| 2015/0372977 A1* | 12/2015 | Yin | H04L 63/0236 726/1 |
| 2016/0112374 A1* | 4/2016 | Branca | H04L 63/102 726/1 |
| 2016/0212099 A1* | 7/2016 | Zou | H04L 63/0263 |
| 2016/0294772 A1* | 10/2016 | Padmanabhan | H04L 63/0263 |
| 2017/0142132 A1* | 5/2017 | Curcio | H04L 63/1408 |
| 2017/0195294 A1* | 7/2017 | Branca | H04L 63/0281 |

\* cited by examiner

FIG. 4

FACILITATING ENFORCEMENT OF SECURITY POLICIES BY AND ON BEHALF OF A PERIMETER NETWORK SECURITY DEVICE BY PROVIDING ENHANCED VISIBILITY INTO INTERIOR TRAFFIC FLOWS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to the field of network management and network security. In particular, various embodiments relate to systems and methods for managing network traffic by and/or on behalf of a perimeter network security device based on internal network traffic or configuration information.

Description of the Related Art

In a typical large private network, a perimeter network security device (e.g., a firewall) may be deployed at the edge or border of the private network (e.g., a corporate or an enterprise network) to separate the private network from an external network, such as the Internet. Multiple Layer 2/3 network devices, such as Layer 2 switches, Layer 3 switches or routers, are connected to the perimeter network security device and other internal devices, such as personal computers, servers, laptop computers and mobile devices of the private network. Network traffic associated with the private network can be classified into two categories based on sources and destinations of the network traffic. One category is internal network traffic in which both the source and the destination of the network traffic are internal devices of the private network. The internal network traffic is switched or routed by the Layer 2/3 network devices within the private network and does not go through the perimeter network security device.

The other category is external network traffic in which one of the source or destination of the network traffic is within the external network. As such, external network traffic is network traffic exchanged between the private network and the external network (i.e., incoming or outgoing network traffic that goes through and is inspected by the perimeter network security device). The perimeter network security device may be configured with multiple security policies that define security operations to be applied to the external network traffic. The security operations may include, but are not limited to, network firewalling, virtual private networking (VPN), antivirus, intrusion prevention (IPS), content filtering, data leak prevention, antispam, antispyware, logging, reputation-based protections, event correlation, network access control, vulnerability management, load balancing and traffic shaping.

Notably, however, the perimeter network security device's visibility and hence its effectiveness in enforcing the security policies of the private network is limited to network traffic that passes through it. Therefore, in the context of a private network lacking distributed security appliances within its interior, internal network traffic traverses only Layer 2/3 network devices, which do not implement security functionalities. As a result of the lack of inspection of internal network traffic, internal network traffic associated with malicious activity conducted by a network host (e.g., any end device within the private network), for example, an internal client device attempting to access an internal server in an unauthorized manner, evades detection by perimeter network security devices.

Therefore, there is a need for enhancing the visibility of a perimeter network security device to facilitate inspection and control of internal network traffic within a private network by and/or on behalf of the perimeter network security device.

SUMMARY

Systems and methods are described for managing network traffic by or on behalf of a perimeter network security device based on internal network traffic or configuration information. According to one embodiment, a network security appliance separating a private network from an external network and controlling external network traffic that is transmitted between the private network and the external network receives internal network information collected by multiple Layer 2 or Layer 3 (Layer 2/3) network devices of the private network that communicatively couple multiple internal host devices of the private network and the network security appliance. The Layer 2/3 network devices switch/route internal network traffic among the internal host devices without the internal network traffic passing through or being observed by the network security device and switch/route the external network traffic between the network security appliance and the internal host devices. A topology of the private network is derived by the network security appliance based on the internal network information. Existence of potential malicious activity involving an internal host device is identified by the network security appliance by evaluating the internal network information. Responsive thereto the network security device (i) creates a traffic policy to control transmission of network traffic originated by or directed to the internal host device; and (ii) causes the traffic policy to be enforced.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 4 shows an example of identifying an internal host device by a perimeter network security device in accordance with an embodiment of the present invention.

DETAILED DESCRIPTION

Figure 1:
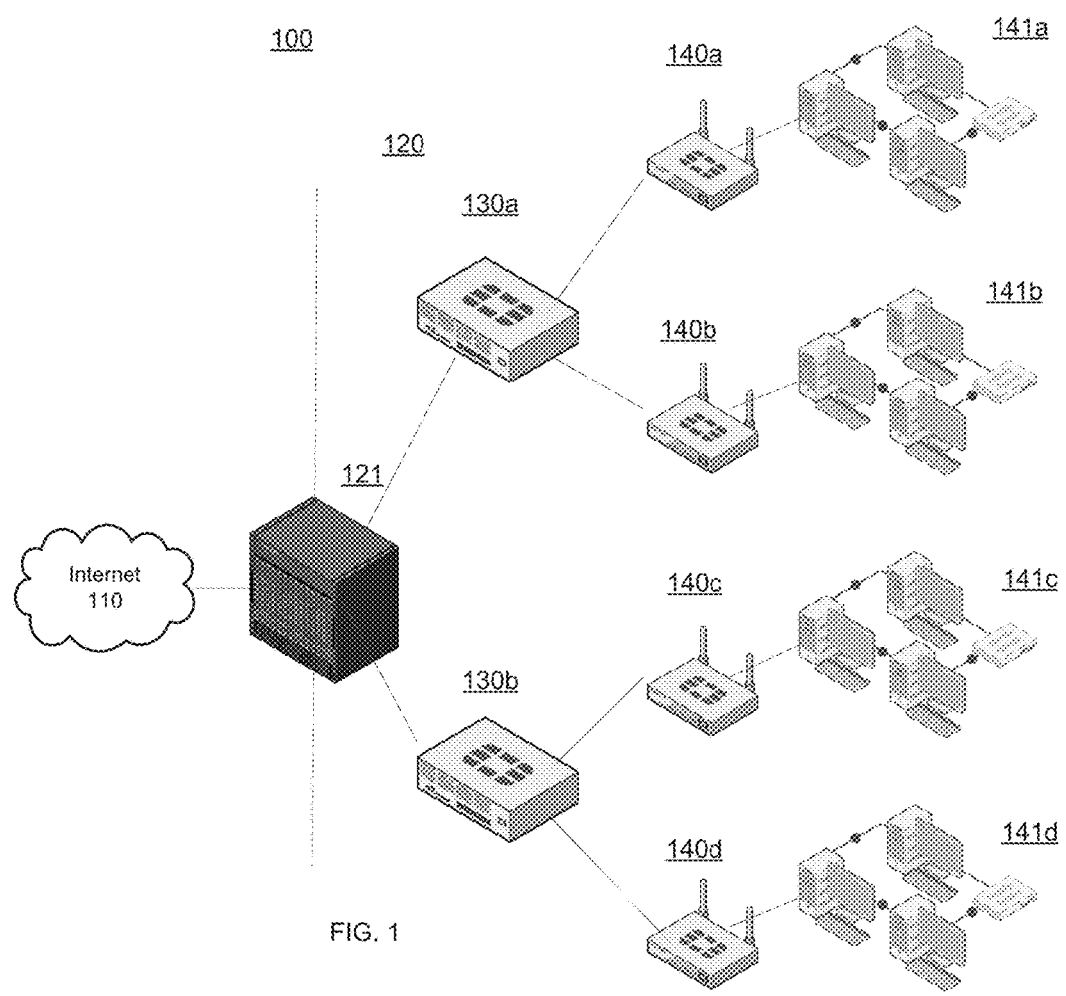
FIG. 1 illustrates an exemplary network architecture in accordance with an embodiment of the present invention.

Systems and methods are described for managing network traffic by a perimeter network security device based on internal network traffic or configuration information. In various embodiments of the present invention, a perimeter network security appliance receives internal network information (e.g., one or more of topology information, host identity and capability information, host configuration information, interior network flow/traffic information and traffic log information), which may be collected by multiple Layer 2 or Layer 3 (Layer 2/3) network devices within a private network. The perimeter network security device identifies a topology of the private network based on the internal network information and may cause an appropriate Layer 2/3 network device (identified based on the topology) to enforce an internal network traffic policy to block or log traffic originating from or directed to an untrusted host device within the private network.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be executed by hardware components or may be embodied in machine-executable instructions, which may be used to cause a general-purpose or special-purpose processor programmed with the instructions to execute the steps. Alternatively, the steps may be executed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to execute a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates exemplary a network architecture 100 in accordance with an embodiment of the present invention. In the context of the present example, network architecture 100 includes a private network 120 which is connected to the Internet 110. Private network 120 includes a perimeter network security appliance 121 (e.g., a firewall device, a gateway device implementing firewall functionality, a unified threat management (UTM) security appliance or the like), Layer 2/3 network devices 130a-b, 140a-d and subnets 141a-d.

In this example, private network 120 may be a network of a corporation and subnets 141a-141d may be department networks that are used exclusively by different departments of the corporation. Each of subnets 141a-d may comprise multiple computers and servers that are coupled in communication with each other by Layer 2/3 network devices 140a-d through a Local Area Network (LAN) or wireless LAN (WLAN).

Perimeter network security appliance 121 separates the internal computing environment of private network 120 from the external computing environment, represented by Internet 110. Perimeter network security appliance 121 may intercept the communication between Internet 110 and the network appliances of private network 110 and may, among other things, scan for malicious activities such as malware, viruses or high risk network accesses based on its network policies.

Subnet 141a-d may include multiple internal host devices, such as client machines, servers, end devices and other network resources or devices that are part of private network 110, which may hereafter be referred to as internal network hosts or internal host devices. Each of internal host devices is directly or indirectly connected to a Layer 2/3 network device 140a-d in order to facilitate communications among the internal devices. Layer 2/3 network devices 140a-d are connected to Layer 2/3 network devices 130a-b in order to facilitate communications among subnets 141a-d. Layer 2/3 network devices 130a-b are connected to perimeter network security appliance 121 to as to allow the internal host devices within subnets 141a-d to be connected to the Internet 110.

In the present example, network traffic transmitted on private network 110 can be classified into two categories—internal network traffic and external network traffic. For internal network traffic (i.e., network traffic between internal host devices), layer 2/3 network devices 130a-b and 140a-d may switch or route such network traffic from a source internal host device to a destination internal host device without such network traffic going through perimeter network security appliance 121. For external network traffic (i.e., network traffic between an internal host device and a device associated with the external network, including incoming network traffic originating from the Internet 110 and directed to an internal host device and outgoing network traffic originating from an internal host device and directed to the Internet 110. External network traffic necessarily must pass through perimeter network security appliance 121 and will therefore be inspected by perimeter network security appliance 121.

In the present example, Layer 2/3 network devices may learn the topology of private network 120 through control plane protocols, including, but not limited to Address Resolution Protocol (ARP), Border Gateway Protocol (BGP), Open Shortest Path First (OSPF) and Routing Information Protocol (RIP). Layer 2/3 network devices may also collect information regarding other Layer 2/3 network devices through neighbor discovery protocols (e.g., Link Layer Discovery Protocol (LLDP)). For example, a Layer 2/3 network device may provide the following information to its neighboring devices and collect it from its neighboring devices:

Host name;
Internet Protocol (IP) address;
Media Access Control (MAC) address;
Types of device;
Serial number;
Model type;
Type of service available;
Configuration;
Physical layer capability; and
Enhanced location.

The above information may be stored within management information databases (MIBs) associated with the Layer 2/3 network devices and can be queried by other Layer 2/3 network devices and/or perimeter network security appliance 121 using the Simple Network Management Protocol (SNMP), for example.

Layer 2/3 network devices may also collect network traffic information through flow export protocols or data collection protocols, including, but not limited to, sampled flow (sFlow), NetFlow and Internet Protocol Flow Information Export (IPFIX). Samples of network traffic, including internal and external network traffic, may also be collected and analyzed by Layer 2/3 network devices to improve the switching and/or routing performed by Layer 2/3 network devices. Samples of network traffic may be in the form of data packets, data frames or headers thereof that are switched or routed by Layer 2/3 network devices 130a-b and 140a-d. The samples may include source and destination addresses, protocols and services associated with internal network traffic. By analyzing the samples, internal network activities, including malicious network activities, may be identified.

Some network services provided by internal servers may also provide topology information or internal network traffic information of private network 120. For example, a Dynamic Host Configuration Protocol (DHCP) server of private network 120 may provide IP address assignment records of private network 120 and Media Access Control (MAC) addresses and IP addresses of connected internal host devices as wells as subnet structures of private network 120 may be shown by the records. A Domain Name System (DNS) server of private network 120 may also provide host names of internal host devices of private network 120. Internal application servers, such as File Transfer Protocol (FTP) servers, mail servers, Hypertext Transfer Protocol (HTTP)/web servers, may keep a log of for the accesses from internal host devices.

The configuration information of internal host devices, internal network traffic samples and internal network traffic logs collected by Layer 2/3 network devices 130a-b and 140a-d, network services and application servers can be transmitted or collected by perimeter network security appliance 121. Perimeter network security appliance 121 may analyze the internal network information to identify the topology, types, statuses and/or activities of internal host devices of private network 120 to enhance the visibility of perimeter network security appliance 121 beyond that which would typically be available to an edge security device. Perimeter network security appliance 121 may also create internal network policies based on the topology, types, statuses or activities of internal host devices and send the internal network policies to Layer 2/3 network devices for an enforcement by Layer 2/3 network devices to control the internal network traffic if Layer 2/3 network devices have the capability to do so. For example, Layer 2/3 network devices 140a-d may support port-based traffic control and switching/routing tables of Layer 2/3 network devices can be configured to allow or block network traffic at particular ports through configuration commands and/or an application programming interface (API).

As a non-limiting example of internal network activities that can be sampled and communicated to perimeter network security appliance 121, consider an internal client machine that is coupled to port 0 of Layer 2/3 network device 140a accessing a document of another internal client machine that is coupled to port 1 of Layer 2/3 network device 140b. The internal network traffic relating to this activity may be captured by Layer 2/3 network device 140a and sent to perimeter network security appliance 121. Perimeter network security appliance 121 analyzes the internal network traffic and identifies that the access is not allowed based on the network security policies. Then, perimeter network security device 121 may issue configuration commands to Layer 2/3 network device 140a and/or call configuration APIs of Layer 2/3 network device 140a to cause Layer 2/3 network device 140a to block subsequent network traffic on port 0 in order to block the client machine from further access to internal resources.

In another non-limiting example, perimeter network security appliance 121 may also create internal network policies based on observed external network activities. For example, when an internal client machine is accessing an external network, the network traffic from the internal client machine to the external network is inspected by perimeter network security appliance 121. If the access at issue from the internal client machine to the external network is restricted according to the security policy of perimeter network security appliance 121, perimeter network security appliance 121 may block the external network traffic and the internal client machine will be unable to access the external network. Meanwhile, as the internal client machine has attempted an unauthorized activity (e.g., a potential malicious activity), perimeter network security appliance 121 may determine that the internal client machine has been compromised and is no longer trusted and may direct appropriate Layer 2/3 network devices to block the internal network activities of the client machine as well. For example, perimeter network security appliance 121 may create an internal network policy and sent it to a Layer 2/3 network device to which that the internal client machine is connected. The Layer 2/3 network device configures its routing or switching table accordingly in order to block the internal network traffic originating from the client machine.

In a further non-limiting example, perimeter network security appliance 121 may fine tune internal network traffic between the internal host devices of private network 120 based on the types, statuses or activities of internal host devices recognized from the internal network information or information from the external network information. For example, perimeter network security appliance 121 may create a whitelist or blacklist for each of the internal host devices and configure ports of the Layer 2/3 network devices according to the whitelist or blacklist to appropriately allow and/or restrict access by each of the internal host devices to internal network resources.

Figure 2:
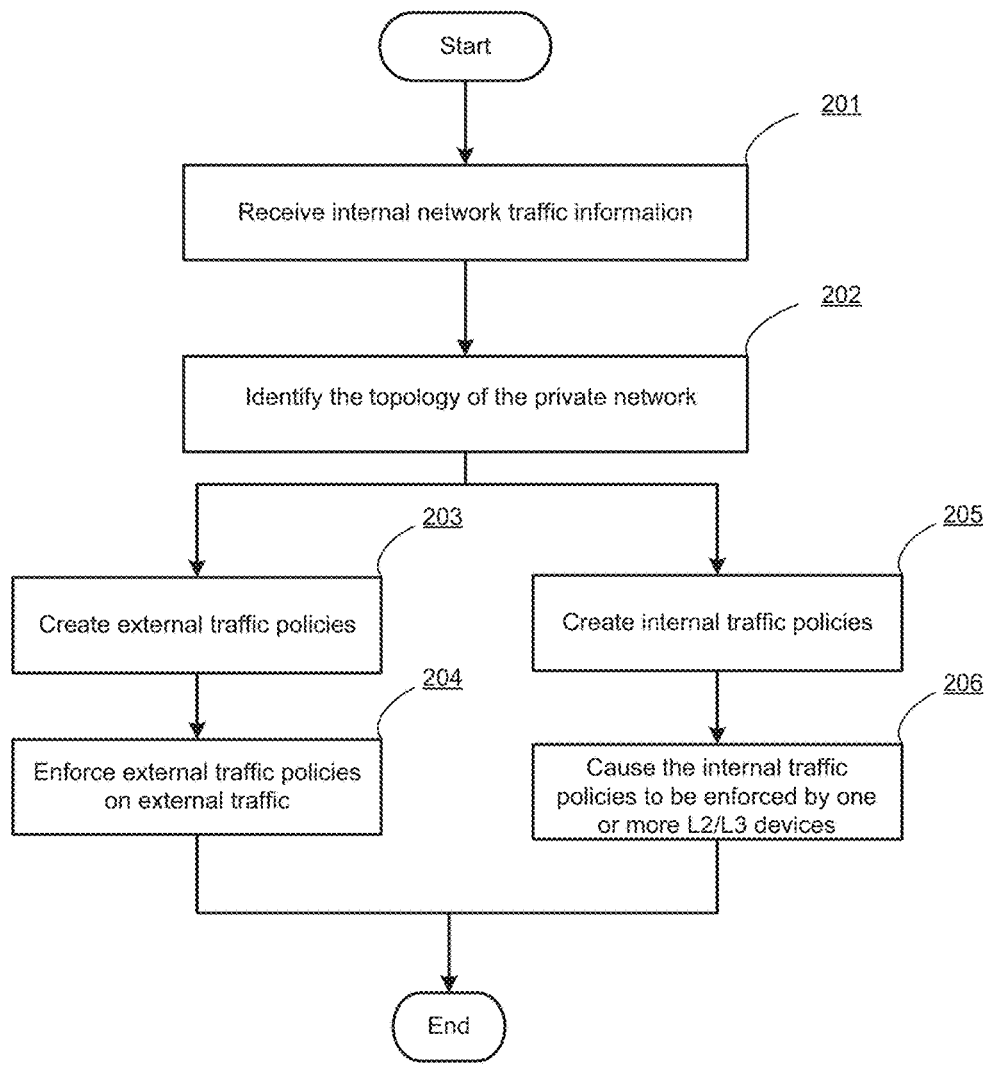
FIG. 2 is a flow diagram illustrating a method for obtaining a network topology of a private network and controlling internal and external network traffic by a perimeter network security device in accordance with an embodiment of the present invention.

FIG. 2 is a flow diagram illustrating a method for obtaining internal host device information from interior traffic flows and controlling internal and external network traffic by a perimeter network security device in accordance with an embodiment of the present invention. In the present example, a perimeter network security device is deployed at the edge of a private network and is configured to inspect external network traffic that is coming from an external network, such as the Internet or going out to the external network from the private network. Multiple Layer 2/3 network devices (e.g., switches or routers) are deployed inside the private network and are used to couple internal host devices to each other as well as the perimeter network security device in order that the internal host devices can access other internal host devices and the external network. The Layer 2/3 network devices may gather indicative of the topology of the private network by collecting configuration information of other Layer 2/3 network devices. When internal network traffic is switched by Layer 2/3 switches, layer 2 forwarding tables, including MAC addresses, IP addresses and connected ports of internal host devices are established by the Layer 2/3 switches based on address resolution protocol (ARP). Layer 2/3 network devices may also collect samples of network traffic, including internal and external network traffic, by making use of flow export protocols and/or data collection protocols. In this manner, the Layer 2/3 network devices may collect internal network information that would not otherwise be available to the perimeter network security device. This internal network information may then be made available to (e.g., pushed to or pulled by) the perimeter network security device and used to enhance the visibility of the perimeter network security device and facilitate more effective control of internal and external network traffic by the perimeter network security device, thereby increasing compliance with the security policies of the private network.

At block 201, a perimeter network security device receives internal network information collected by Layer 2/3 network devices of the private network. The internal network information collected by the Layer 2/3 network devices may be transmitted to or retrieved by the perimeter network security device periodically or may be accessed on demand by the perimeter network security device. The internal network information may include, but is not limited to, L2 forwarding tables, routing tables, internal network traffic samples, configuration and topology information of switches, routers and internal host devices. The perimeter network security device may also collect logs of internal network activities from internal network services, such as Dynamic Host Configuration Protocol (DHCP) servers and Domain Name System (DNS) servers. These logs may record network IP addresses, machines names that are assigned to internal host devices when the internal host devices are connected to the private network. The perimeter network security device may also collect logs of internal network activities from internal application servers (e.g., File Transfer Protocol (FTP) servers, Hypertext Transfer Protocol (HTTP) server and mail servers). These logs may also record accesses made to internal application servers by the internal host devices.

Figure 3:
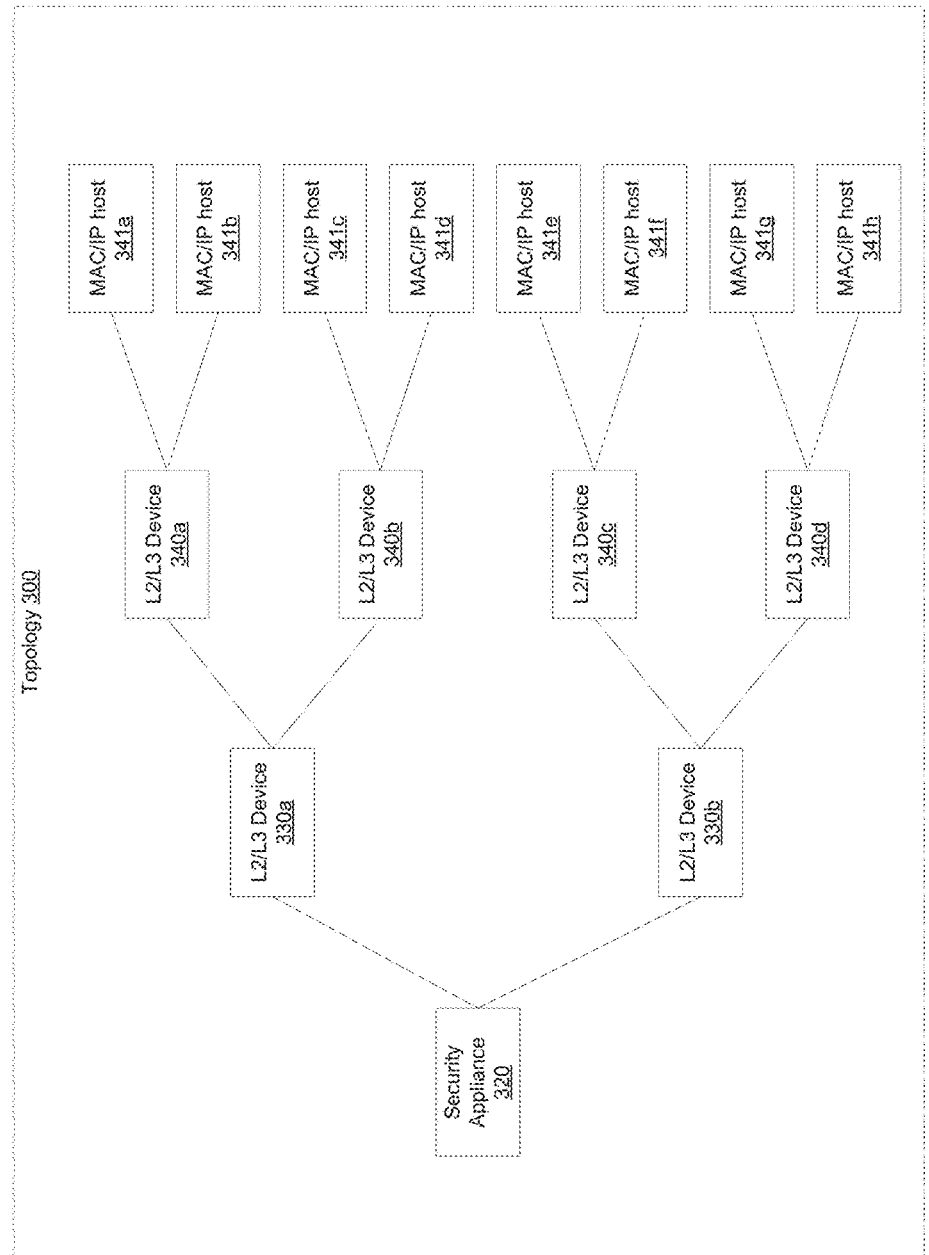
FIG. 3 shows a topology of a private network derived by a perimeter network security device in accordance with an embodiment of the present invention.

At block 202, the perimeter network security device may analyze the internal network information collected by Layer 2/3 network devices and other internal servers to identify the network topology of the private network and internal network activities. In one example, the perimeter network security device may analyze the forwarding tables retrieved from layer 2 switches of the private network and may determine the topology of the host machines that are connected to the private network. The perimeter network security device may discover all the IP addresses/MAC addresses of host machines and the port numbers of switches to which the host machines are connected. The perimeter network security device may also determine the subnets/Virtual LANs (VLANs) within the private network and host machines that belong to each of the subnets/VLANs based on the forwarding tables. The perimeter network security device may also derive the entire topology of the Layer 2/3 network devices of the private network by summarizing/aggregating topology information collected by individual Layer 2/3 network devices. FIG. 3 shows a topology 300 of a private network. In FIG. 3, a perimeter network security device 320 is at the root of the tree representing topology 300. Two layers of internal Layer 2/3 network devices 330a-b and 331a-d connect a layer of host machines 341a-h to perimeter network security device 320.

Figure 4:
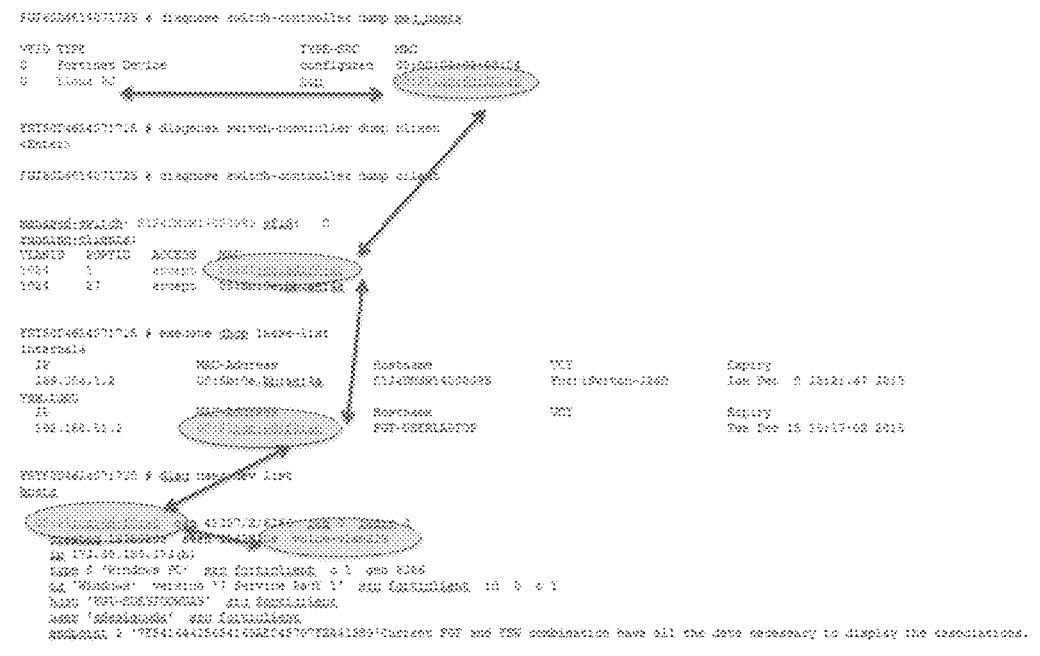

In another example, the perimeter network security device may also combine or associate the internal network configuration information collected from Layer 2/3 network devices within the interior of the private network and obtain detailed information of internal host devices. The detailed information may include the types, positions and configurations of internal host devices. FIG. 4 shows an example of associating internal network information collected by multiple internal Layer 2/3 network devices and servers to recognize a particular device by a network security device. In FIG. 4, a client machine with a MAC address 00: . . . :a0 is assigned with an IP address 192.168.51.2 and has a VLAN ID (VLANID) 1024. The security device compares the L2 MAC address seen on a VLAN and queries the internal Layer 2/3 network devices for this MAC address to identify where the client machine is physically connected. The network security device can also determine the traffic's flow from the port of the internal Layer 2/3 network devices to the network security device by inspecting the L2 network hops and L2 MAC address. In the context of the present example, the configuration information of this client machine shows that it is a Linux PC. Similarly, the perimeter network security device may also recognize other types of internal host devices, e.g., servers, printers, VoIP phones, mobile devices and the like.

The topology of private network enhances the perimeter network security device's visibility into the private network. For example, the perimeter network security device may know the location and configurations of internal host devices. The perimeter network security device may further enhance its visibility in relation to the private network by associating the topology of the private network with information discovered by analyzing the external traffic. For example, the perimeter network security device may capture and inspect the external network traffic and log activities of internal host devices with external networks. By associating the topology of the private network, internal activities or configuration of internal host devices with external activities conducted by the internal host devices, the perimeter network security device may have a full view of activities of internal host devices.

In a further example, internal network activities, especially malicious network activities, may be recognized by the perimeter network security device from the internal network traffic information, such as samples of internal network traffic collected by Layer 2/3 network devices. For example, an internal network traffic sample recorded by a Layer 2/3 network device may indicate that a client machine has accessed a restricted internal FTP server that the client machine does not have the right to access. In another example, the perimeter network security device may analyze application server logs to discover malicious accesses or activities conducted by internal host devices.

When internal malicious activities conducted by internal host devices are discovered by the perimeter network security device based on internal network traffic information, the perimeter network security device may enhance internal and external network security. For example, when an access to a restricted internal FTP server by an internal host device is identified based on evaluation of the internal network traffic information, the perimeter network security device may block the internal host device from subsequent access to the external network as well as to the internal network if possible.

At block 203, the perimeter network security device may create external traffic policies to enhance the inspection of the network traffic going to/from the internal host devices that are involved in potential malicious internal network activities. For example, the perimeter network security device may create a new external traffic policy for an internal host device that conducted or attempted an access, violating the private network's security policies, to an internal resource so as to block, log and/or perform deep packet inspection on external network traffic involving the internal host device.

At block 204, the perimeter network security device may enforce the external traffic policies (including those created based on analysis of the internal network traffic information) and inspect the external traffic going to/from the internal host devices. Therefore, network security is enhanced by the perimeter network security device based on the visibility provided to the perimeter network security device into internal network traffic activities.

At block 205, the perimeter network security device may create internal traffic policies to control internal network traffic potentially associated with malicious internal network activities. For example, some Layer 2/3 switches have the ability to conduct port-based traffic control. As such, the internal traffic policy may specify that internal network traffic passing through a particular port is to be blocked, logged and/or allowed.

At block 206, the internal traffic policies or configuration commands may be sent to Layer 2/3 network devices to control the internal network traffic accordingly. The perimeter network security device may cause the Layer 2/3 switches enforce the newly created internal traffic policy (e.g., block or allow certain internal network traffic on a particular port) by issuing configuration commands to the Layer 2/3 switches and/or by configuring the Layer 2/3 switches via their respective configuration APIs. For example, a port that is connected to an internal host device that has conducted an illegal access to an FTP server may be blocked by the internal traffic policy created by the perimeter network security device, thereby blocking subsequent internal network traffic originated by or destined to the internal host device at issue. Therefore, internal network security is enhanced by the perimeter network security device being provided with visibility into internal network activities.

Figure 5:
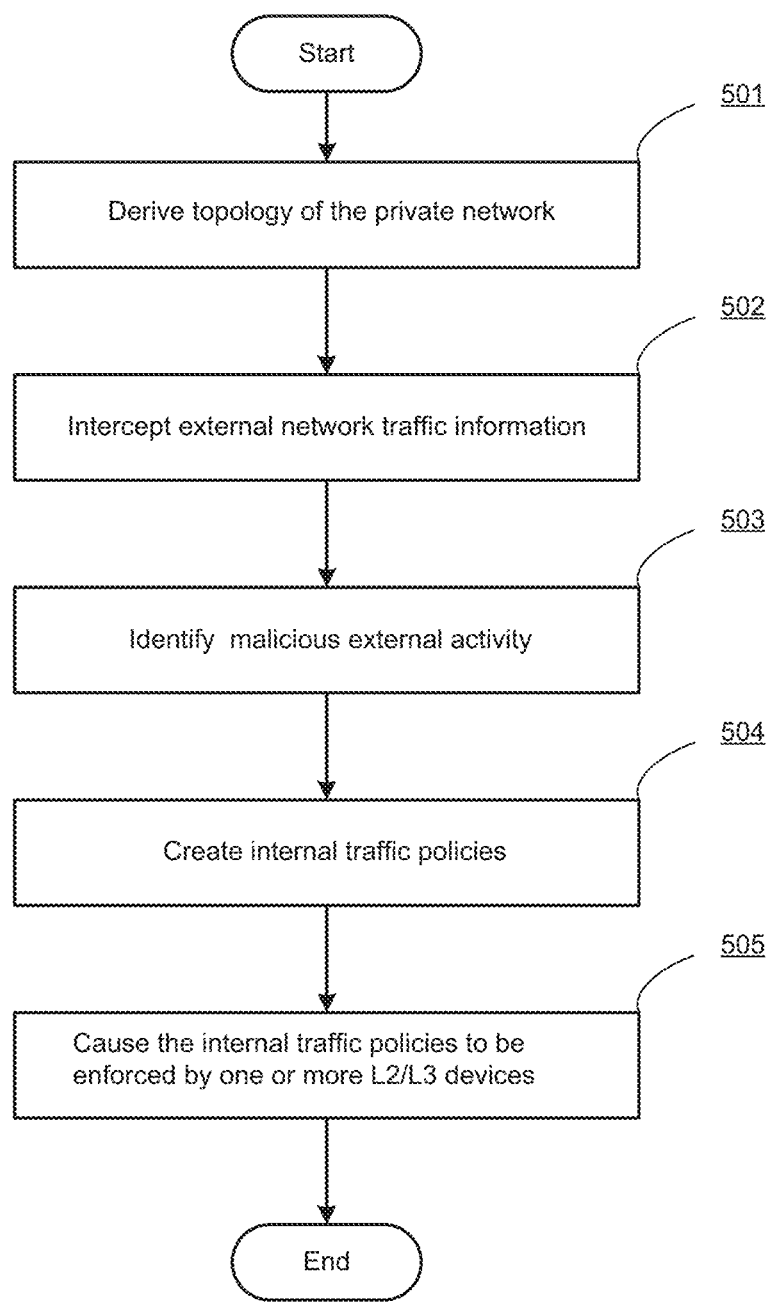
FIG. 5 is a flow diagram illustrating a method for controlling internal and external network traffic by a perimeter network security device in accordance with another embodiment of the present invention.

FIG. 5 is a flow diagram illustrating a method for controlling internal network traffic by a perimeter network security device based on external network activities in accordance with another embodiment of the present invention.

At block 501, a perimeter network security device derives a topology of a private network based on internal network information acquired from interior Layer 2/3 network devices of the private network as shown in blocks 201 and 202 of FIG. 2.

At block 502, the perimeter network security device intercepts external traffic going from/to external networks.

At block 503, the perimeter network security device may inspect the external network traffic and identify external malicious activities associated with internal host devices based on an analysis of the external network traffic. For example, the perimeter network security device may detect that a virus has been attempted to be transferred to an internal client machine from an external network, an internal client machine is transferring restricted content to an external network or an internal client machine is otherwise violating a security policy of the private network.

At block 504, the perimeter network security device may create one or more internal traffic policies to control the internal network traffic of the potentially compromised internal host devices (e.g., those that have been observed to be involved in potentially malicious external network activities violating security policies of the private network) to enhance internal network security. For example, when a client machine is observed attempting to transfer restricted content to an external network, the perimeter network security device can create an internal network traffic policy or configuration command to cause a Layer 2/3 network device to block subsequent internal traffic originating from and/or directed to the client machine.

At block 505, the internal traffic policies or configuration commands may be sent to Layer 2/3 network devices to cause the Layer 2/3 network devices to control the internal network traffic accordingly. For example, port-based traffic control commands may be sent to a Layer 2/3 network device and the Layer 2/3 network device updates its port-based control policy and blocks network traffic of the port to which the internal client machine is connected. After the port is blocked, the client machine cannot access internal network resources. Therefore, internal network security is enhanced by the perimeter network security device based on evaluation of external network activities.

Figure 6:
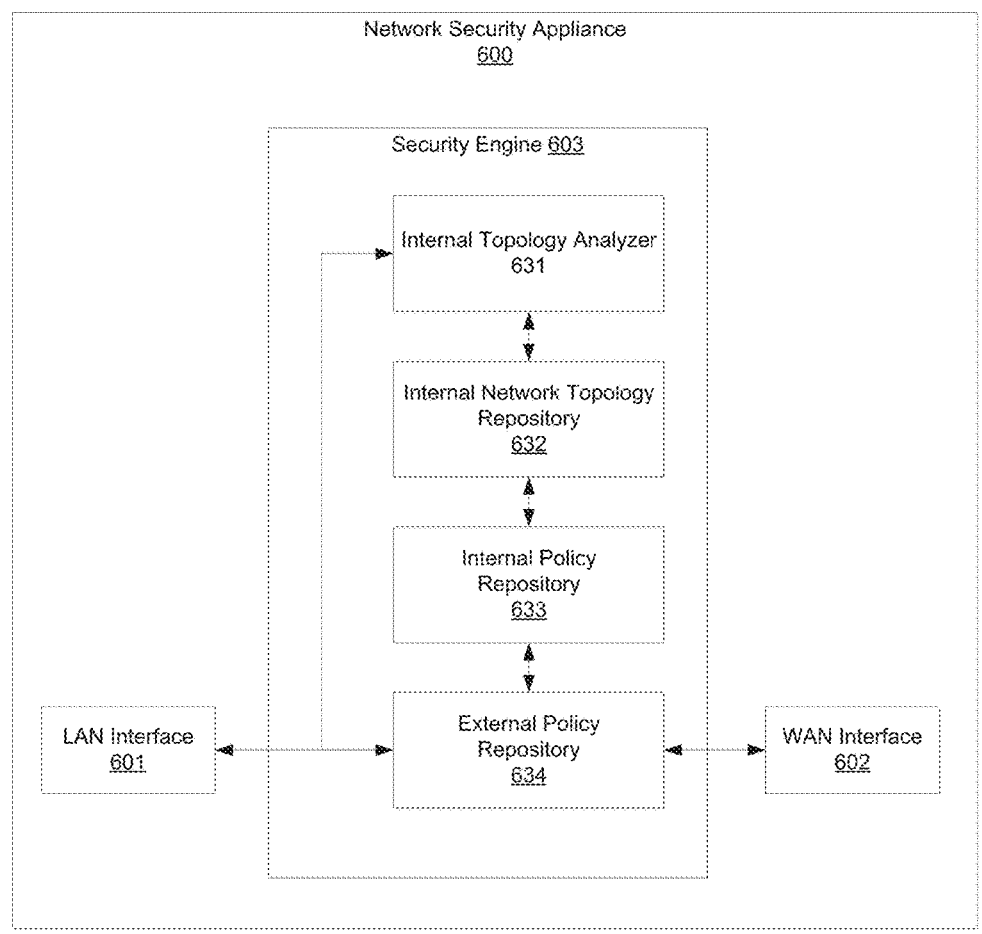
FIG. 6 is a block diagram illustrating functional units of a network security appliance that is capable of controlling internal and external network traffic in accordance with an embodiment of the present invention.

FIG. 6 is a block diagram illustrating functional units of a network security appliance 600 that is capable of controlling internal and external network traffic in accordance with an embodiment of the present invention. In the present example, network security device 600 includes a LAN interface 601, a WAN interface 602 and a security engine 603. LAN interface 602 is used for connecting to Layer 2/3 network devices within a private network. Layer 2/3 network devices may be layer 2/3 switches or routers that are configured to transmit network traffic to/from internal host devices. WAN interface is used for connecting one or more external networks, such as the Internet. Security engine 603 is used for intercepting and inspecting external network traffic between the private network and the external networks to control network activities based on security policies stored in external policy repository 634. Incoming network traffic that is transmitted from an external network and received at WAN interface 602 may be inspected, logged or deep inspected as defined by the external network policies. If the external network complies with the network policies, it is transferred to LAN interface 601 and then switched/routed by Layer 2/3 network devices to its destination. If the external network traffic does not comply with the network policies, it may be blocked from being transferring to LAN interface 601. Similarly, outgoing network traffic that is received at LAN interface 601 is transferred to WAN interface 602 if it complies with the network policies. The outgoing network traffic may be blocked and logged if it does not comply with the network policies.

In the present example, security engine 603 further includes an internal network analyzer 631, an internal network topology repository 632 and an internal network policy repository 633. Internal network traffic information and internal network configuration information that are collected by Layer 2/3 network devices, internal network services or internal application servers of the private network may be received by internal network analyzer 631 through LAN interface 603. Internal network traffic information and internal network configuration information may include Layer 2 forwarding tables, samples of internal network traffic, DHCP records, LLDP configuration information and access logs of internal services or servers. Internal network analyzer 631 may extract MAC addresses, IP addresses and associated port numbers of internal host devices from the internal network traffic information or internal configuration information and derive therefrom a network topology of the private network that may be stored within internal network topology repository 632. The internal network topology may be aggregated/associated with network information gathered from external network traffic to further enhance the currently understood network topology. For example, when an incoming network packet destined to an internal IP address is captured, security engine 603 may check the internal network topology and determine the Layer 2/3 switch and the corresponding port number to which the destination device having the internal IP address is connected.

In one example, internal network analyzer 631 may check the internal network traffic information collected from Layer 2/3 network devices to inspect internal network activities, especially malicious network activities conducted by internal host devices within the internal network. When a malicious internal network activity conducted by an internal host device within the private network is detected, an internal network policy may be created by security engine 603 and stored within internal network policy repository 633 in order to control the internal network traffic to and/or from the internal host device. The internal network policy, such as port-based traffic control commands, may be sent to a corresponding Layer 2/3 switch based on the internal network topology. The Layer 2/3 switch may configure its layer 2 forwarding table to block the port connecting to the internal host device that conducted the malicious internal network activities. Therefore, security appliance 600 may control internal network traffic (by causing Layer 2/3 network devices to enforce internal network policies) even though it is deployed at a border of a private network as a perimeter network security device and even though the internal network traffic being controlled is not attempting to pass through security appliance 600.

In another example, when a malicious internal network activity conducted by an internal host device within the private network is detected by internal network analyzer 631, security engine 603 may create an external security policy to control external network traffic associated with the internal host device to enhance external network security. For example, security engine 603 may create and enforce an external network policy to log, inspect or block external network traffic that is coming from or going to the internal host device after such malicious internal network activities have been detected. In this manner, security of the private network may be enhanced based on observations relating to activities within the private network.

In a further example, security engine 603 may check external network traffic to inspect external network activities, especially malicious network activities, associated with internal host devices. When a malicious external network activity associated with an internal network is detected in the external network traffic, an internal network policy may be created by security engine 603 and stored in internal network policy repository 633 in order to control the internal network traffic of the internal host device. For example, when security engine 603 detects that restricted content has been sent or is attempting to be sent to an internal client machine from an external network or by an internal client machine to an external machine, security engine 603 may block the external traffic at the border of the private network. Security engine 603 may further send port-based traffic control commands to a corresponding Layer 2/3 switch based on the internal network topology to cause the Layer 2/3 switch to restrict traffic flow to and/or from the internal client machine at issue. For example, the Layer 2/3 switch may configure its layer 2 forwarding table to block the port connecting to the internal client machine that was observed attempting to receive or transfer restricted content so as to block subsequent internal network traffic originating from and/or directed to the client machine. In this manner, security of the private network may be enhanced based on observations relating to external network traffic entering and/or leaving the private network.

In a further example, security engine 603 may identify types of the internal host devices from the internal configuration information collected by the Layer 2/3 network devices. For example, security engine 603 may identify Voice over IP (VoIP) phones, user PCs, servers mobile phones and guest devices based on information collected by Layer 2/3 network devices with LLDP and create granular internal network policies and external security policies for the different types of devices. The internal network policies for the different types of devices may be sent to Layer 2/3 network devices for enforcement and the external security policies for the different types of devices may be enforced by security engine 603.

In a further example, security engine 603 may associate internal network information and external network information to provide enhanced visibility of internal host devices and provide better control over the private network. Security engine 603 may decide whether a device is 'trusted' and create a corresponding security policy to allow its internal or external network traffic. Security engine 603 may block or deep inspect internal or external network traffic of an 'untrusted' device. Security engine 603 may further create a whitelist or blacklist for internal host devices based on the topology of the internal network. Security engine 603 may send the whitelist or blacklist to Layer 2/3 network devices and enforce port-based traffic control based on the whitelist or blacklist in order to fine tune the internal network traffic.

Figure 7:
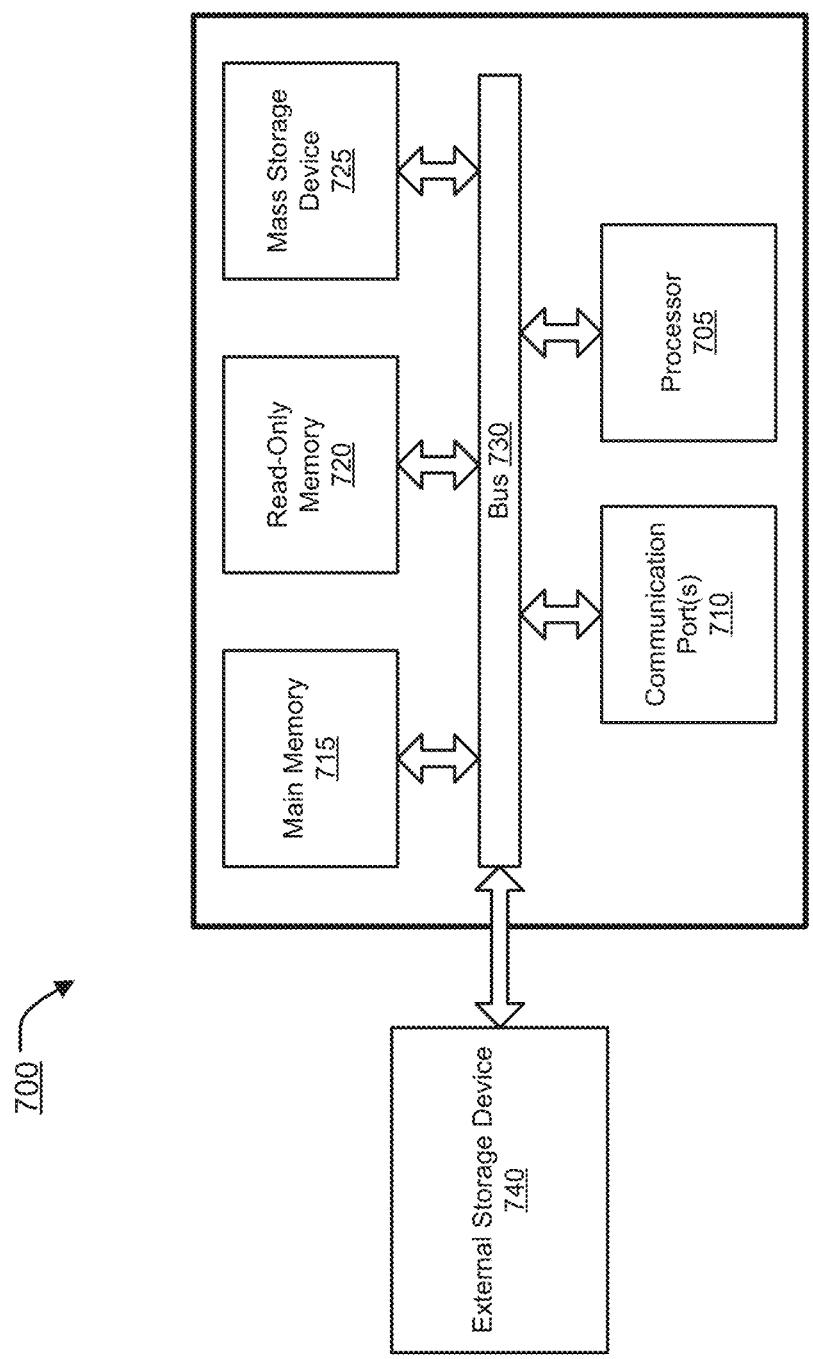
FIG. 7 is an exemplary computer system in which or with which embodiments of the present invention may be utilized.

FIG. 7 is an example of a computer system 700 with which embodiments of the present disclosure may be utilized. Computer system 700 may represent or form a part of a network security appliance (e.g., perimeter network security appliance 121, security appliance 320 or network security appliance 600), a Layer 2/3 network device (e.g., Layer 2/3 network devices 130*a-b*, 140*a-d*, 330*a-b* or 340*a-d*), a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
    receiving, by a network security appliance separating a private network from an external network and controlling external network traffic that is transmitted between the private network and the external network, internal network information collected by a plurality of Layer 2 or Layer 3 (Layer 2/3) network devices of the private network that communicatively couple a plurality of internal host devices of the private network and the network security appliance, wherein the plurality of Layer 2/3 network devices switch/route internal network traffic among the plurality of internal host devices without the internal network traffic passing through or being observed by the network security appliance and switch/route the external network traffic between the network security appliance and the plurality of internal host devices, wherein the internal network information includes one or more of (i) information regarding internal network flows and (ii) information extracted from forwarding or routing tables of one or more of the plurality of Layer 2/3 network devices;
    deriving, by the network security appliance, a topology of the private network based on the internal network information; and
    identifying, by the network security appliance, existence of potential malicious activity involving an internal host device of the plurality of internal host devices by evaluating the internal network information;
    responsive to said identifying:
        creating, by the network security appliance, a traffic policy to control transmission of network traffic originated by or directed to the internal host device; and
        causing, by the network security appliance, the traffic policy to be enforced.

2. The method of claim 1, wherein the internal network information is associated with a control plane protocol.

3. The method of claim 1, where in the control plane protocol comprises one or more of:
    Address Resolution Protocol (ARP);
    Routing Information Protocol (RIP);
    Border Gateway Protocol (BGP);
    Dynamic Host Configuration Protocol (DHCP);
    Domain Name System (DNS); and
    Open Shortest Path First (OSPF).

4. The method of claim 1, wherein the internal network information comprises traffic samples from the internal network traffic captured by one or more of the plurality of Layer 2/3 network devices using a flow export protocol.

5. The method of claim 4, wherein the flow export protocol comprises sampled flow (sFlow), NetFlow or Internet Protocol Flow Information Export (IPFIX).

6. The method of claim 1, wherein said identifying, by the network security appliance, existence of potential malicious activity involving an internal host device of the plurality of internal host devices comprises identifying network activity by the internal host device that violates one or more security policies of the private network.

7. The method of claim 6, further comprising determining, by the network security appliance, a Layer 2/3 network device of the plurality of Layer 2/3 network devices to which the internal host device is connected based on the topology.

8. The method of claim 7, wherein the traffic policy comprises an internal traffic policy and wherein said causing, by the network security appliance, the traffic policy to be enforced comprises causing the traffic policy to be enforced by the determined Layer 2/3 network device.

9. The method of claim 8, wherein said causing the traffic policy to be enforced by the determined Layer 2/3 network device comprises configuring the determined Layer 2/3 network device to allow or block network traffic on a port of the determined Layer 2/3 network device to which the internal host device is connected to the determined Layer 2/3 network device by issuing configuration commands, by the network security appliance, to the determined Layer 2/3 network device or by configuring, by the network security appliance, the determined Layer 2/3 network device via an application programming interface (API) of the determined Layer 2/3 network device.

10. The method of claim 1, further comprising:
    inspecting, by the network security appliance, the external network traffic between the plurality of internal host devices and the external network; and
    wherein said identifying, by the network security appliance, existence of potential malicious activity involving an internal host device of the plurality of internal host devices comprises based on said inspecting, identifying network activity within the external network traffic and targeting the internal host device that violates one or more security policies of the private network.

11. A perimeter network security device comprising:
    a non-transitory storage device having embodied therein one or more routines; and
    one or more processors coupled to the non-transitory storage device and operable to execute the one or more routines to perform a method comprising:
        receiving, internal network information collected by a plurality of Layer 2 or Layer 3 (Layer 2/3) network devices of a private network that communicatively couple a plurality of internal host devices of the private network and the perimeter network security device, wherein the internal network information includes one or more of (i) information regarding internal network flows and (ii) information extracted from forwarding or routing tables of one or more of the plurality of Layer 2/3 network devices;

deriving a topology of the private network based on the internal network information;

identifying existence of potential malicious activity involving an internal host device of the plurality of internal host devices by evaluating the internal network information; and responsive to said identifying:

creating a traffic policy to control transmission of network traffic originated by or directed to the internal host device; and causing the traffic policy to be enforced.

12. The perimeter network security device of claim 11, wherein the internal network information is associated with a control plane protocol.

13. The perimeter network security device of claim 11, where in the control plane protocol comprises one or more of:

Address Resolution Protocol (ARP);
Routing Information Protocol (RIP);
Border Gateway Protocol (BGP);
Dynamic Host Configuration Protocol (DHCP);
Domain Name System (DNS); and
Open Shortest Path First (OSPF).

14. The perimeter network security device of claim 11, wherein the internal network information comprises traffic samples from the internal network traffic captured by one or more of the plurality of Layer 2/3 network devices using a flow export protocol.

15. The perimeter network security device of claim 11, wherein said identifying existence of potential malicious activity involving an internal host device of the plurality of internal host devices comprises identifying network activity by the internal host device that violates one or more security policies of the private network.

16. The perimeter network security device of claim 15, wherein the method further comprises determining a Layer 2/3 network device of the plurality of Layer 2/3 network devices to which the internal host device is connected based on the topology.

17. The perimeter network security device of claim 16, wherein the traffic policy comprises an internal traffic policy and wherein said causing, the traffic policy to be enforced comprises causing the traffic policy to be enforced by the determined Layer 2/3 network device.

18. The perimeter network security device of claim 17, wherein said causing the traffic policy to be enforced by the determined Layer 2/3 network device comprises configuring the determined Layer 2/3 network device to allow or block network traffic on a port of the determined Layer 2/3 network device to which the internal host device is connected to the determined Layer 2/3 network device by issuing configuration commands to the determined Layer 2/3 network device or by configuring the determined Layer 2/3 network device via an application programming interface (API) of the determined Layer 2/3 network device.

19. The perimeter network security device of claim 11, wherein the method further comprises:

inspecting external network traffic between the plurality of internal host devices and an external network; and wherein said identifying existence of potential malicious activity involving an internal host device of the plurality of internal host devices comprises based on said inspecting, identifying network activity within the external network traffic and targeting the internal host device that violates one or more security policies of the private network.

* * * * *